US012451037B2

(12) United States Patent
Park

(10) Patent No.: US 12,451,037 B2
(45) Date of Patent: Oct. 21, 2025

(54) METHOD OF INSPECTING A PIXEL

(71) Applicant: Samsung Display Co., LTD., Yongin-si (KR)

(72) Inventor: Pongok Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 278 days.

(21) Appl. No.: 18/355,578

(22) Filed: Jul. 20, 2023

(65) Prior Publication Data

US 2024/0096251 A1 Mar. 21, 2024

(30) Foreign Application Priority Data

Sep. 20, 2022 (KR) ........................ 10-2022-0118572

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2310/0275* (2013.01); *G09G 2330/10* (2013.01); *G09G 2330/12* (2013.01)

(58) Field of Classification Search
CPC ........ G09G 3/006; G09G 3/32; G09G 3/3233; G09G 2310/0275; G09G 2330/10; G09G 2330/12; G09G 2320/0295
See application file for complete search history.

(56) References Cited

U.S. PATENT DOCUMENTS

| | | | | |
|---|---|---|---|---|
| 5,805,110 | A | 9/1998 | McEwan | |
| 10,163,417 | B2 * | 12/2018 | Kim | G09G 3/3688 |
| 2005/0180083 | A1 * | 8/2005 | Takahara | H10K 59/88 361/152 |
| 2011/0205250 | A1 * | 8/2011 | Yoo | G09G 3/3233 345/77 |
| 2014/0160185 | A1 * | 6/2014 | Okuno | G09G 3/3233 345/691 |
| 2018/0218703 | A1 * | 8/2018 | Lee | G09G 3/3648 |
| 2020/0118488 | A1 * | 4/2020 | Kim | H10K 59/1216 |

* cited by examiner

*Primary Examiner* — Christopher E Mahoney
(74) *Attorney, Agent, or Firm* — CANTOR COLBURN LLP

(57) ABSTRACT

A method of inspecting a pixel includes measuring a first drain current by applying a first gate voltage with a first voltage interval to a gate terminal of a transistor included in a test pattern in a first voltage period, generating a first gate voltage-drain current graph based on the first drain current, measuring a second drain current by applying a second gate voltage which is lower than the first gate voltage with a second voltage interval which is different from the first voltage interval to the gate terminal of the transistor in a second voltage period which is different from the first voltage period, generating a second gate voltage-drain current graph based on the second drain current, and determining a defect of the transistor based on the first gate voltage-drain current graph and the second gate voltage-drain current graph.

20 Claims, 11 Drawing Sheets

METHOD OF INSPECTING A PIXEL

CROSS REFERENCE TO RELATED APPLICATION(S)

This application claims priority to and the benefits of Korean Patent Application No. 10-2022-0118572 under 35 U.S.C. § 119, filed on Sep. 20, 2022, in the Korean Intellectual Property Office (KIPO), the entire contents of which are incorporated herein by reference.

BACKGROUND

1. Technical Field

Embodiments relate to a method of inspecting a pixel. More particularly, embodiments relate to a method of inspecting a pixel for detecting a defect in a transistor included in a pixel during a manufacturing process of a display device.

2. Description of the Related Art

In the display industry, because a battle with yield continues and an increase of the yield is linked to price competition, the yield became a factor greatly affecting a manufacturing cost of a display device. One of the most important things to increase the yield is a method of inspecting a pixel and a direct current test (DC test) may be one of the methods of inspecting.

A purpose of inspecting the pixel during a manufacturing process of the display device is to detect a defect in a transistor during a process and prevent a defective transistor from passing to a next process. The DC test may measure electrical characteristics of the transistor to check whether the transistor operates normally. On the other hand, as a display becomes increasingly high-resolution and a structure of a display panel becomes increasingly complex, a noise may increase in case that a DC test is performed and a drain current of the transistor is measured. Therefore, due to the increase in the noise, there is a limit in that a time of a noise filtering process increases.

SUMMARY

Embodiments provide a method of inspecting a pixel reducing inspection time by varying an interval between gate voltages applied to a gate terminal of a test transistor according to a period of the gate voltages applied to a gate terminal of a test transistor.

Embodiments provide a method of inspecting a pixel varying an interval between gate voltages applied to a gate terminal of a test transistor according to a period of the gate voltages applied to a gate terminal of a test transistor and reducing inspection time by inspecting test transistors.

A method of inspecting a pixel according to an embodiment, the method may include measuring a first drain current by applying a first gate voltage with a first voltage interval to a gate terminal of a transistor included in a test pattern in a first voltage period, generating a first gate voltage-drain current graph based on the first drain current, measuring a second drain current by applying a second gate voltage which is lower than the first gate voltage with a second voltage interval which is different from the first voltage interval to the gate terminal of the transistor in a second voltage period which is different from the first voltage period, generating a second gate voltage-drain current graph based on the second drain current, and determining a defect of the transistor based on the first gate voltage-drain current graph and the second gate voltage-drain current graph.

In an embodiment, the first drain current and the second drain current may be different.

In an embodiment, the first drain current may be lower than the second drain current.

In an embodiment, the first voltage interval may be greater than the second voltage interval.

In an embodiment, a compensation drain current other than the first drain current measured in the first voltage period may be determined by using a lookup table in which the first drain current corresponding to the first gate voltage is stored.

A method of inspecting a pixel according to an embodiment, the method may include measuring a first drain current by applying a first gate voltage for a first voltage interval to a gate terminal of a transistor included in a test pattern in a first voltage period, generating a first gate voltage-drain current graph based on the first drain current, measuring a second drain current by applying a second gate voltage which is lower than the first gate voltage for a second voltage interval to the gate terminal of the transistor in a second voltage period which is different from the first voltage period, generating a second gate voltage-drain current graph based on the second drain current, measuring a third drain current by applying a third gate voltage which is lower than the second gate voltage for a third voltage interval to the gate terminal of the transistor in a third voltage period which is different from the first voltage period and the second voltage period, generating a third gate voltage-drain current graph based on the third drain current, and determining a defect of the transistor based on the first gate voltage-drain current graph, the second gate voltage-drain current graph, and the third gate voltage-drain current graph. At least two of the first voltage interval, the second voltage interval, and the third voltage interval may be different from each other.

In an embodiment, the first drain current, the second drain current, and the third drain current may be different from each other.

In an embodiment, the first drain current may be lower than the second drain current.

In an embodiment, the second drain current may be lower than the third drain current.

In an embodiment, the first voltage interval and the second voltage interval may be greater than the third voltage interval.

In an embodiment, a compensation drain current other than the first drain current measured in the first voltage period and the second drain current measured in the second voltage period may be determined by using a lookup table in which the first drain current corresponding to the first gate voltage and the second drain current corresponding to the second gate voltage are stored.

In an embodiment, the first voltage interval may be greater than the second voltage interval and the third voltage interval.

In an embodiment, a compensation drain current other than the first drain current measured in the first voltage period may be determined by using a lookup table in which the first drain current corresponding to the first gate voltage is stored.

A method of inspecting a pixel according to an embodiment, the method may include determining at least two of a first transistor that generates a driving current, a second transistor that transmits a data voltage, and a third transistor that initializes a light emitting element, which are included in a test pattern, measuring a first drain current by applying a first gate voltage for a first voltage interval to gate terminals of the at least two of the first transistor, the second transistor, and the third transistor, in a first voltage period, generating a first gate voltage-drain current graph based on the first drain current, measuring a second drain current by applying a second gate voltage which is lower than the first gate voltage for a second voltage interval to the gate terminals of the at least two of the first transistor, the second transistor, and the third transistor in a second voltage period which is different from the first voltage period, generating a second gate voltage-drain current graph based on the second drain current, measuring a third drain current by applying a third gate voltage which is lower than the second gate voltage for a third voltage interval to the gate terminals of the at least two of the first transistor, the second transistor, and the third transistor in a third voltage period being different from the first voltage period and the second voltage period, generating a third gate voltage-drain current graph based on the third drain current, and determining defects of the at least two of the first transistor, the second transistor, and the third transistor based on the first gate voltage-drain current graph, the second gate voltage-drain current graph, and the third gate voltage-drain current graph. At least two of the first voltage interval, the second voltage interval, and the third voltage interval may be different from each other.

In an embodiment, the first drain current, the second drain current, and the third drain current may be different from each other.

In an embodiment, the first drain current may be lower than the second drain current, and the second drain current may be lower than the third drain current.

In an embodiment, the first voltage interval and the second voltage interval may be greater than the third voltage interval.

In an embodiment, a compensation drain current other than the first drain current measured in the first voltage period and the second drain current measured in the second voltage period may be determined by using a lookup table in which the first drain current corresponding to the first gate voltage and the second drain current corresponding to the second gate voltage are stored.

In an embodiment, the first voltage interval may be greater than the second voltage interval and the third voltage interval.

In an embodiment, a compensation drain current other than the first drain current measured in the first voltage period may be determined by using a lookup table in which the first drain current corresponding to the first gate voltage is stored.

A method of inspecting a pixel according to embodiments may divide gate voltages applied to a gate terminal of a test transistor into voltage intervals, and an inspection time may be reduced by applying the gate voltages to the gate terminal of the test transistor with differential intervals based on each of the voltage periods.

A method of inspecting a pixel according to embodiments may determine a compensated drain current other than a measured drain current by applying gate voltages to gate terminals of a test transistor with differential intervals by using a lookup table in which drain currents corresponding to the gate voltages are stored, and an inspection time may be reduced by inspecting multiple transistors.

However, the effects of the embodiments are not limited to the above-described effects, and may be variously expanded without departing from the spirit and scope of the disclosure.

BRIEF DESCRIPTION OF THE DRAWINGS

The above and other features and advantages of the embodiments will become more apparent by describing in detailed embodiments thereof with reference to the accompanying drawings, in which.

DETAILED DESCRIPTION OF THE EMBODIMENTS

Figure 1:
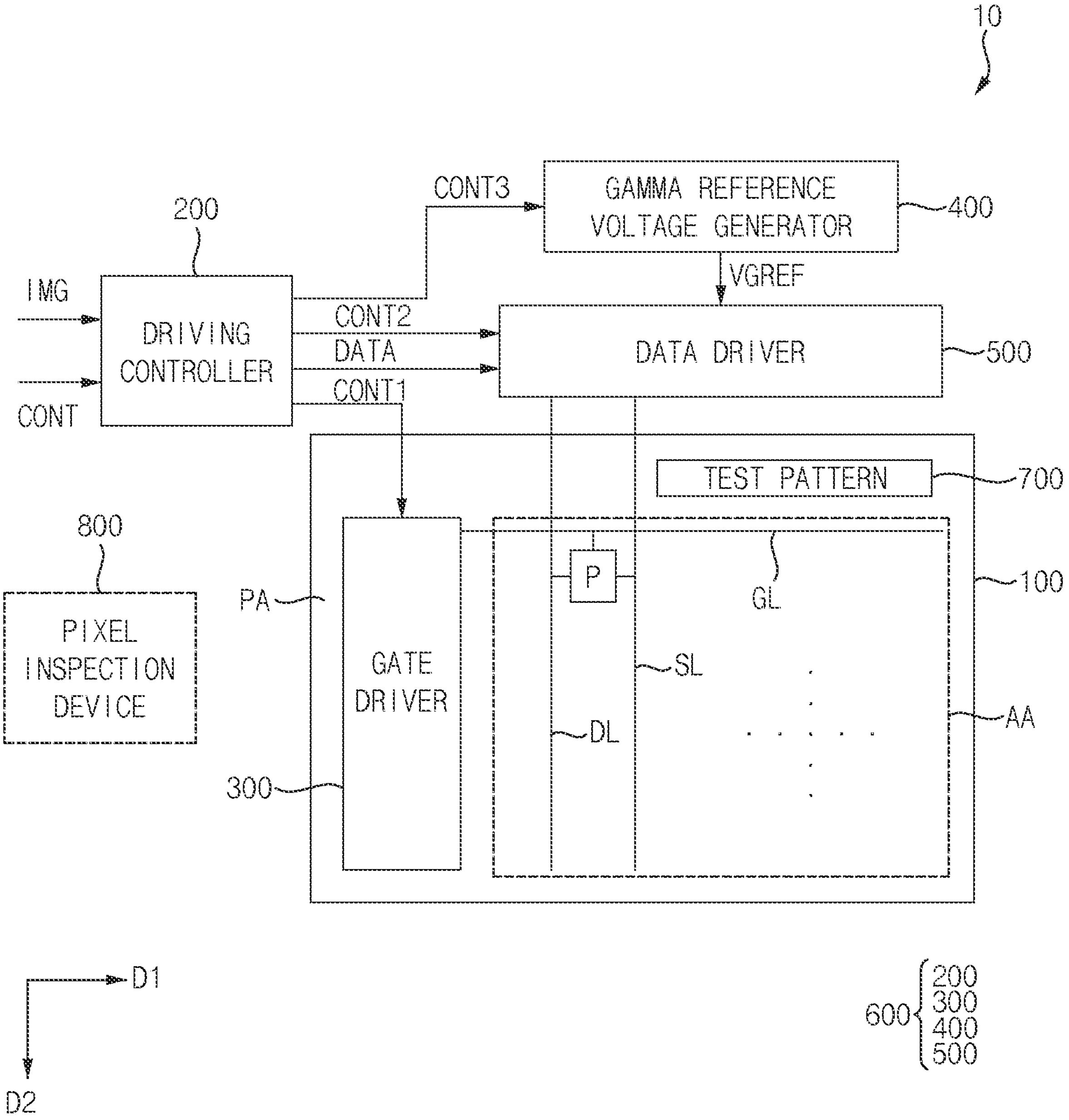
FIG. 1 is a schematic block diagram illustrating a display device according to embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

When a component is described herein to "connect" another component to the other component or to be "connected to" other components, the components may be connected to each other as separate elements, or the components may be integral with each other.

The first direction DR1, the second direction DR2, and the third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The display surface may be parallel to a surface defined by a first direction D1 and a second direction D2. A normal direction of the display surface, i.e., a thickness direction of the display device 10, may indicate a third direction D3. In this specification, an expression of "when viewed from a plane or on a plane" may represent a case when viewed in the third direction D3. Hereinafter, a front surface (or a top surface) and a rear surface (or a bottom surface) of each of layers or units may be distinguished by the third direction D3. However, directions indicated by the first to third directions D1, D2, and D3 may be a relative concept, and converted with respect to each other, e.g., converted into opposite directions.

Unless otherwise specified, the illustrated embodiments are to be understood as providing example features of the disclosure. Therefore, unless otherwise specified, the features, components, modules, panels, regions, and/or aspects, etc. (hereinafter individually or collectively referred to as "elements"), of the various embodiments may be otherwise combined, separated, interchanged, and/or rearranged without departing from the disclosure.

In the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

Embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, the embodiments will be explained in detail with reference to the accompanying drawings.

FIG. 1 is a schematic block diagram illustrating a display device 10 according to embodiments.

Referring to FIG. 1, the display device 10 may include a display panel 100 and a display panel driver 600. The display panel driver 600 may include a driving controller 200, a gate driver 300, a gamma reference voltage generator 400 and a data driver 500.

For example, the driving controller 200 and the data driver 500 may be integral with each other. For example, the driving controller 200, the gamma reference voltage generator 400, and the data driver 500 may be integral with each other. A driving module including at least the driving controller 200 and the data driver 500 which are integral with each other may be called a timing controller embedded data driver (TED).

The display panel 100 may include a display region AA on which an image is displayed and a peripheral region PA adjacent to the display region AA.

For example, the display panel 100 may be an organic light emitting diode display panel including an organic light emitting diode. For example, the display panel 100 may be a quantum-dot organic light emitting diode display panel including an organic light emitting diode and a quantum-dot color filter. For example, the display panel 100 may be a quantum-dot nano light emitting diode display panel including a nano light emitting diode and a quantum-dot color filter. For example, the display panel 100 may be a liquid crystal display panel including a liquid crystal layer.

The display panel 100 may include a test pattern 700 in a region other than the display region AA. The test pattern 700 may be formed in the peripheral area PA for inspecting a pixel P of the display panel 100 during a manufacturing process of the display device 10.

In order to inspect the pixel P of the display panel 100, a pixel inspection device 800 which is an external device, may be used.

The display panel 100 may include gate lines GL, data lines DL, and pixels P electrically connected to the gate lines GL and the data lines DL. The gate lines GL may extend in a first direction D1, and the data lines DL may extend in a second direction D2 intersecting the first direction D1.

The display panel 100 may further include sensing lines SL connected (e.g., electrically connected) to the pixels P. For example, the sensing lines SL may extend in the second direction D2.

In an embodiment, the display panel driver 600 may include a sensing driver which receives sensing signals from the pixels P of the display panel 100 through the sensing lines SL. The sensing driver may be disposed in the data driver 500. In case that the data driver 500 has a form of a data driving integrated circuit (IC), the sensing driver may be disposed in the data driving integrated circuit IC. In another embodiment, the sensing driver may be formed independently of the data driver 500.

The driving controller 200 may receive input image data IMG and an input control signal CONT from an external device (not shown). For example, the input image data IMG may include red image data, green image data, and blue image data. The input image data IMG may include white image data. The input image data IMG may include magenta image data, yellow image data, cyan image data, and the like. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500. The driving controller 200 may generate the third control signal CONT3 for controlling the operation of the gamma reference voltage generator 400 based on the input control signal CONT, and output the third control signal CONT3 to the gamma reference voltage generator 400.

The driving controller 200 may compensate the input image data IMG based on a sensing signal sensed through the sensing lines SL.

The gate driver 300 may generate gate signals and output the gate signals to the gate lines GL in response to the first control signal CONT1 received from the driving controller 200. The gate driver 300 may output the gate signals to the gate lines GL. For example, the gate driver 300 may sequentially output the gate signals to the gate lines GL.

In an embodiment, the gate driver 300 may output a gate signal to the gate lines GL which is sensing target in a sensing mode.

In an embodiment, the gate driver 300 may be integrated in the peripheral region PA of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to the data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage VDATA in analog form using the gamma reference voltage VGREF. The data driver 500 may output the data voltage VDATA to the data line DL.

Figure 2:
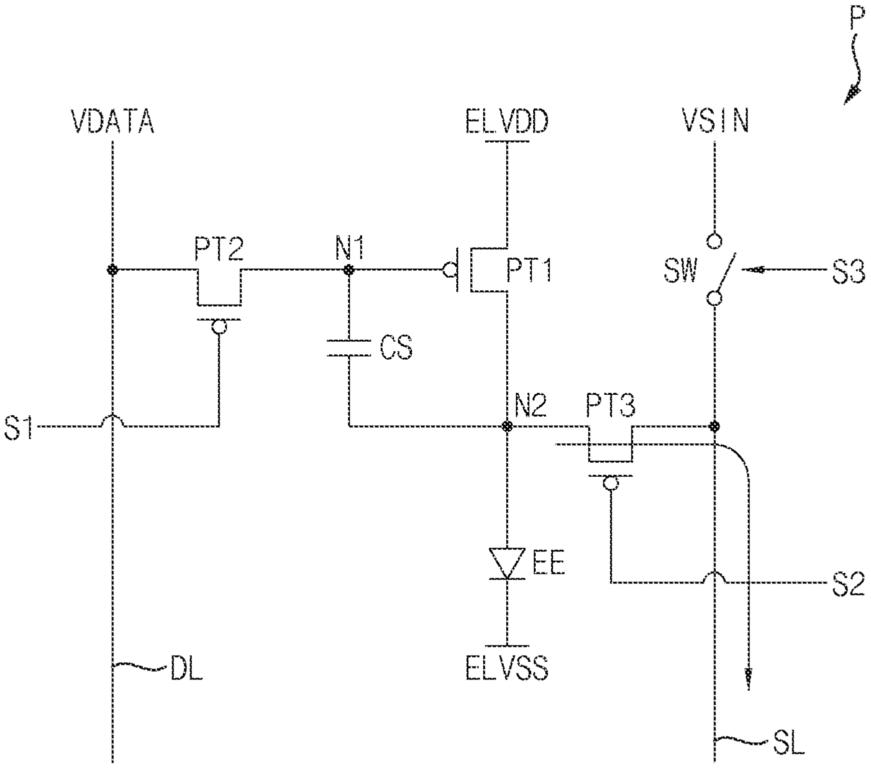
FIG. 2 is a schematic diagram of an equivalent circuit of a pixel included in the display device of FIG. 1 according to an embodiment.

FIG. 2 is a schematic diagram of an equivalent circuit of a pixel P included in the display device 10 of FIG. 1 according to an embodiment.

Referring to FIGS. 1 and 2, the pixel P may include a first pixel transistor PT1 generating a driving current corresponding to a voltage of a first node N1 (i.e., the data voltage VDATA stored in a storage capacitor CS) to flow to a light emitting element EE between a first power supply voltage ELVDD and a second power supply voltage ELVSS, a second pixel transistor PT2 transmitting the data voltage VDATA to the first node N1 in response to a first signal S1, a third pixel transistor PT3 connecting a second node N2 and the sensing line SL in response to a second signal S2, the storage capacitor CS connected between the first node N1 and the second node N2, and the light emitting element EE including a first electrode connected to the second node N2 and a second electrode to which the second power supply voltage ELVSS is applied.

In an embodiment, the second power supply voltage ELVSS may be lower than the first power supply voltage ELVDD. For example, the light emitting element EE may be an organic light emitting diode.

The display device 10 may further include an initialization switch SW applying a sensing initialization voltage VSIN to the sensing line SL. The initialization switch SW may be turned on and off based on a third signal S3. For example, the initialization switch SW may be disposed in the display panel 100, or may be disposed in the sensing driver.

As shown in FIG. 2, the first pixel transistor PT1, the second pixel transistor PT2, and the third pixel transistor PT3 may be p-channel metal oxide semiconductor (PMOS) transistors. However, a type of a transistor (e.g., the first pixel transistor PT1, the second pixel transistor PT2, or the third pixel transistor PT3) included in the pixel P is not limited thereto. For example, the first pixel transistor PT1, the second pixel transistor PT2, and the third pixel transistor PT3 may be n-channel metal oxide semiconductor (NMOS) transistors.

Figure 3:
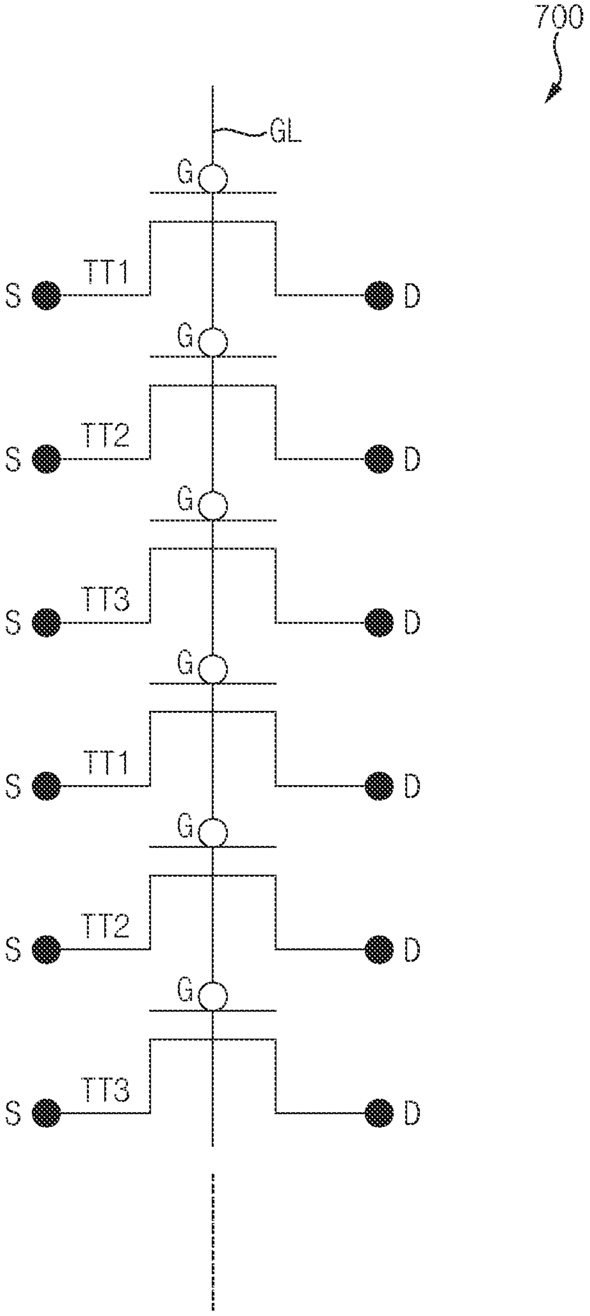
FIG. 3 is a schematic diagram of an equivalent circuit of a circuit of a test pattern for inspecting a pixel in FIG. 1 according to an embodiment.

FIG. 3 is a schematic diagram of an equivalent circuit of a circuit of a test pattern 700 for inspecting a pixel in FIG. 1 according to an embodiment.

Referring to FIGS. 1 to 3, the test pattern 700 may include a first test transistor TT1, a second test transistor TT2, and a third test transistor TT3.

The first test transistor TT1 may be a transistor inspecting characteristics of the first pixel transistor PT1 of each of the pixels P, the second test transistor TT2 may be a transistor inspecting characteristics of the second pixel transistor PT2 of each of the pixels P, and the third test transistor TT3 may be a transistor inspecting characteristics of the third pixel transistor PT3 of each of the pixels P.

An inspection may be performed during the manufacturing process of the display device 10, the pixels P and the test pattern 700 may be simultaneously manufactured under a same condition, the pixels P and the test pattern 700 may be substantially the same, and the test pattern 700 may have a simplified form of each of the pixels P. Therefore, each of the first test transistor TT1, the second test transistor TT2, and the third test transistor TT3 and each of the first pixel transistor PT1, the second pixel transistor PT2, and the third pixel transistor PT3 may be substantially the same.

The first test transistors TT1, the second test transistors TT2, and the third test transistors TT3 may be repeatedly disposed in the test pattern 700.

Gate terminals of the first test transistors TT1, the second test transistors TT2, and the third test transistors TT3 may be connected to the gate line GL. The pixel inspection device 800 may measure drain currents (see, e.g., drain current Id of FIG. 5) of the first test transistors TT1, the second test transistors TT2, and the third test transistors TT3 by applying a gate voltage (see, e.g., gate voltage Vg of FIG. 5) to the gate terminals of the first test transistors TT1, the second test transistors TT2, and the third test transistors TT3.

The pixel inspection device 800 may generate multiple gate voltage-drain current graphs based on the drain current Id. The pixel inspection device 800 may detect defects of the first pixel transistor PT1, the second pixel transistor PT2, and the third pixel transistor PT3 by recognizing the characteristics of the first pixel transistor PT1, the second pixel transistor PT2, and the third pixel transistor PT3 based on the gate voltage-drain current graphs.

A threshold voltage (Vth), an electron mobility, and a S-factor (sf) of a pixel transistor (e.g., the first pixel transistor PT1, the second pixel transistor PT2, or the third pixel transistor PT3) may be calculated through the gate voltage-drain current graphs. In case that the threshold voltage (Vth), the electron mobility, and the S-factor (sf) are out of reference ranges for determining defects of the pixel transistor, the pixel transistor may have defects.

On the other hand, as a display becomes increasingly high-resolution, new technologies may have been applied to the display, and a structure of the display panel 100 may become increasingly complex. Accordingly, a noise may increase in case that the display device 10 is inspected. As a noise increases, a time required for a noise filtering process may increase so that an overall inspection time may increase.

In order to solve the above problem (e.g., problem of increasing the overall inspection time), a method of inspecting a pixel reducing a time required for the noise filtering process may be required. The method of inspecting a pixel may be performed by the pixel inspection device 800.

Figure 4:
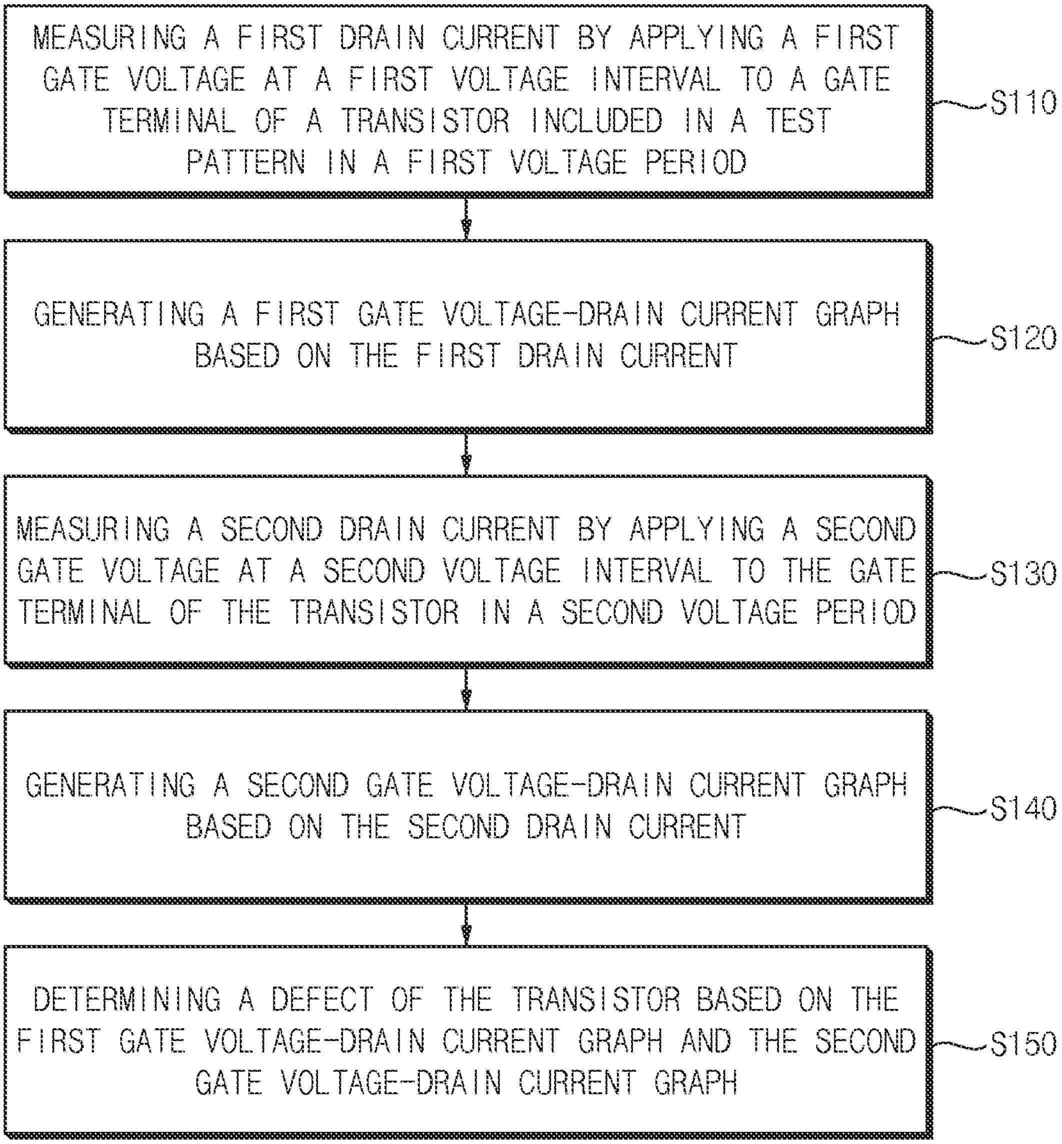
FIG. 4 is a schematic flowchart illustrating a method of inspecting a pixel in FIG. 1 according to embodiments.
Figure 5:
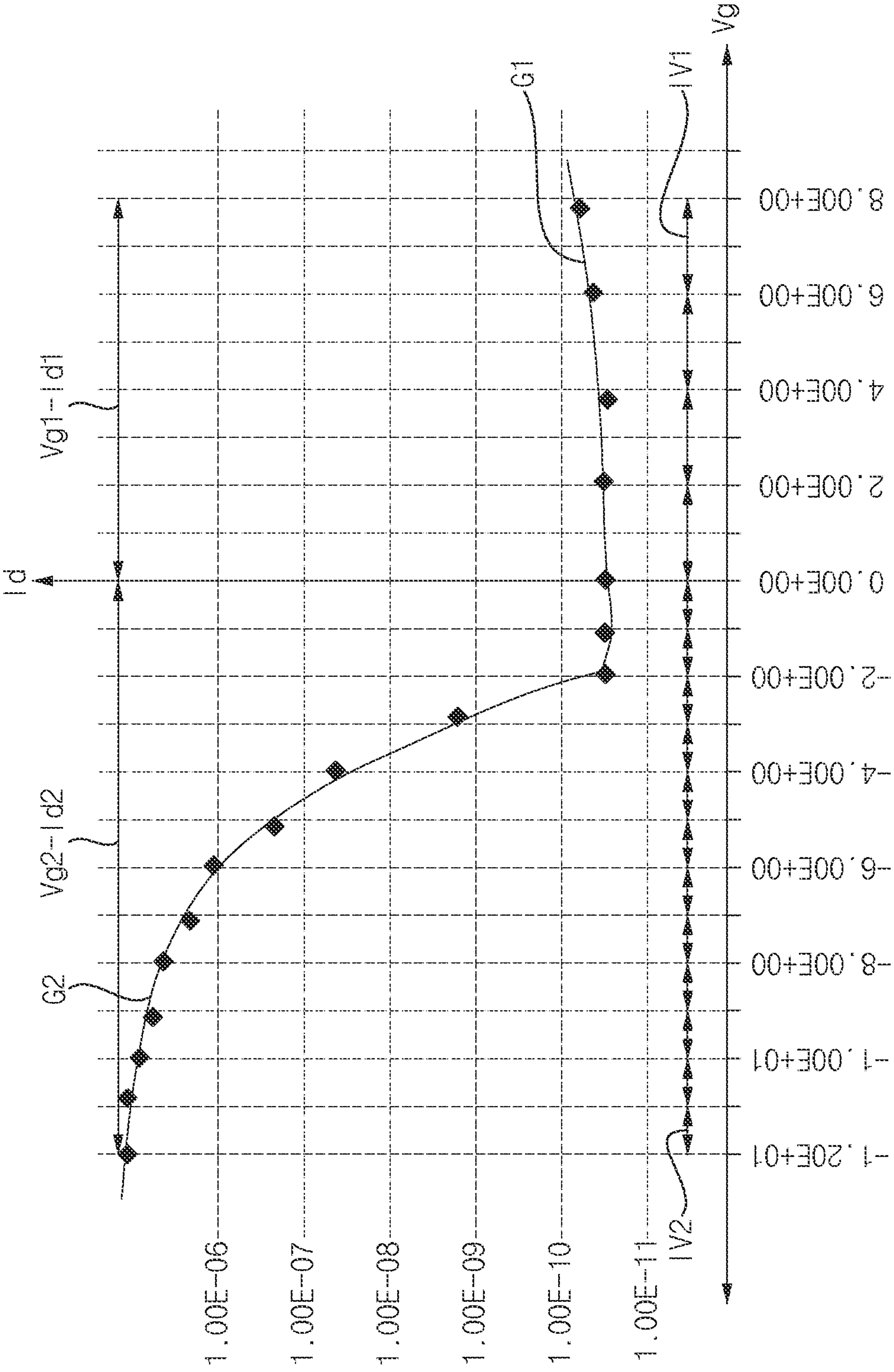
FIG. 5 is a gate voltage-drain current graph generated by the method of FIG. 4.

FIG. 4 is a schematic flowchart illustrating a method of inspecting a pixel in FIG. 1 according to embodiments. FIG. 5 is a gate voltage-drain current graph generated by the method of FIG. 4.

Referring to FIGS. 1 to 5, the method of inspecting a pixel may include measuring a first drain current Id1 by applying a first gate voltage Vg1 with a first voltage interval IV1 to a gate terminal of a transistor (e.g., the first test transistor TT1, the second test transistor TT2, or the third test transistor TT3) included in the test pattern 700 in a first voltage period SV1 (S110). The method may include generating a first gate voltage-drain current graph G1 based on the first drain current Id1 (S120). The method may include measuring a second drain current Id2 by applying a second gate voltage Vg2 which is lower than the first gate voltage Vg1 with a second voltage interval IV2 which is different from the first voltage interval IV1 to the gate terminal of the transistor in a second voltage period SV2 which is different from the first voltage period (S130). The method may include generating a second gate voltage-drain current graph G2 based on the second drain current Id2 (S140). The method may include determining a defect of the transistor based on the first gate voltage-drain current graph G1 and the second gate voltage-drain current graph G2 (S150).

The method may include measuring a first drain current Id1 by applying a first gate voltage Vg1 with a first voltage interval IV1 to a gate terminal of a transistor included in a test pattern 700 in a first voltage period SV1 (S110). The method may include generating a first gate voltage-drain current graph G1 based on the first drain current Id1 (S120).

The pixel inspection device 800 may measure the first drain current Id1 by applying the first gate voltage Vg1 with the first voltage interval IV1 to a gate terminal of a test transistor (e.g., the first test transistor TT1, the second test transistor TT2, or the third test transistor TT3) in the first voltage period SV1 in order to inspect characteristics of a pixel transistor (e.g., the first pixel transistor PT1, the second pixel transistor PT2, or the third pixel transistor PT3).

The first voltage period SV1 may be a period for measuring the first drain current Id1 of the test transistor, and the first drain current Id1 may be a low current in the first voltage period SV1.

The first gate voltage Vg1 may be a voltage applied to the gate terminal of the test transistor for the first voltage period SV1.

The first voltage interval IV1 may be a voltage interval with which the first gate voltage Vg1 is applied to the gate terminal of the test transistor. For example, the first voltage interval IV1 may be a difference in voltages applied to the gate terminal of the test transistor between a first gate voltage Vg1 and another first gate voltage Vg1.

The first voltage period SV1 may be a low-current period. In case of the low-current period, in case that the pixel inspection device 800 measures the first drain current Id1 of the test transistor, there may be much noise.

For example, in case that an inspection error of the pixel inspection device 800 is constantly about 1.00E−11 A in both a high-current period where a drain current Id is greater than or equal to about 1.00E−06 A and a low-current period where the drain current Id is less than about 1.00E−10 A, an error rate may be greater in the low-current period of the drain current Id than in the high-current period of the drain current Id. In case that an interval with which a gate voltage Vg is applied to the gate terminal of the test transistor is short to allow a number of measurements of the drain current Id to be increased during a same time, noise may be increased. Therefore, in case that an interval with which the first gate voltage Vg1 is applied to the gate terminal of the test transistor is short in the first voltage period SV1, which is the low-current period of the drain current Id, the time required for the noise filtering process for removing noise may be long.

In order to solve the above problem, the first voltage interval IV1, which is an interval with which the first gate voltage Vg1 is applied, may be increased.

For example, the pixel inspection device 800 may measure the first drain current Id1 by applying the first gate voltage Vg1 to a gate terminal of a first test transistor TT1 in order to inspect characteristics of a first pixel transistor PT1. The first gate voltage Vg1 may be in a range of about 0.00E+00 V to about 8.00E+00 V in the first voltage period SV1. The first drain current Id1 may be less than or equal to about 1.00E−10 A, which is a low current. Therefore, in case that the pixel inspection device 800 measures the first drain current Id1 of the first test transistor TT1, there may be much noise. The noise may be greater (or increase) in case that the first gate voltage Vg1 is applied to the gate terminal of the first test transistor TT1 while being gradually decreased by about 0.25 V (2.50E−01 V) from about 8.00E+00 V than in case that the first gate voltage Vg1 is applied while being gradually decreased by about 2.00E+00 V from about 8.00E+00 V. Accordingly, the time required for the noise filtering process may be longer in the embodiment where the first gate voltage Vg1 is applied while being gradually decreased by about 0.25 V from about 8.00E+00 V than in the embodiment where the first gate voltage Vg1 is applied while being gradually decreased by about 2.00E+00 V from about 8.00E+00 V. In order to reduce the time required for the noise filtering process, the first voltage interval IV1 may be about 2.00E+00 V rather than about 0.25 V. Because a number of measurements is reduced in case that the first voltage interval IV1 is about 2.00E+00 V as compared with case that the first voltage interval IV1 is about 0.25 V, detected noise may be reduced.

In an embodiment, a compensation drain current other than the first drain current Id1 measured in the first voltage period SV1 may be determined by using a lookup table (LUT) in which the first drain current Id1 corresponding to the first gate voltage Vg1 is stored.

The lookup table (LUT) may store drain currents Id corresponding to gate voltages Vg. The lookup table (LUT) may store drain currents Id corresponding to gate voltages Vg of a first pixel transistor PT1, a second pixel transistor PT2, and a third pixel transistor PT3. In an embodiment, values of the drain currents Id stored in the lookup table (LUT) may be values obtained through experiments performed on the display device 10, or may be values which are strategically determined.

For example, in order to reduce the time required for the noise filtering process, the first voltage interval IV1 may be about 2.00E+00 V rather than about 0.25 V in the first voltage period SV1, which is in a range of about 0.00E+00 V to about 8.00E+00 V. The first gate voltage Vg1 applied to the gate terminal of the first test transistor TT1 may be gradually decreased by about 2.00E+00 V, so that about 8.00E+00 V, about 6.00E+00 V, and about 4.00E+00 V may be some of the measured values. The first gate voltage Vg1 applied to the gate terminal of the first test transistor TT1 may not be about 7.75E+00 V, about 7.50E+00 V, or about 7.25E+00 V. In order to determine the first drain current Id1 corresponding to about 8.00E+00 V, about 6.00E+00 V, or about 4.00E+00 V, a compensation drain current may be determined by using the lookup table (LUT).

As such, the first gate voltage-drain current graph G1 may be generated based on the measured first drain current Id1 and the compensation drain current determined by using the lookup table (LUT).

The method may include measuring a second drain current Id2 by applying a second gate voltage Vg2 which is lower than the first gate voltage Vg1 with a second voltage interval IV2 which is different from the first voltage interval IV1 to the gate terminal of the transistor in a second voltage period SV2 which is different from the first voltage period SV1 (S130). The method may include generating a second gate voltage-drain current graph G2 based on the second drain current Id2 (S140).

The pixel inspection device 800 may measure the second drain current Id2 by applying the second gate voltage Vg2 which is lower than the first gate voltage Vg1 with the second voltage interval IV2 which is different from the first voltage interval IV1 to the gate terminal of the test transistor in the second voltage period SV2 which is different from the first voltage period SV1 in order to inspect the characteristics of the pixel transistor.

The second voltage period SV2 may be a period for measuring the second drain current Id2 of the test transistor, and the second voltage period SV2 may be a high-current period.

The second gate voltage Vg2 may be a voltage applied to the gate terminal of the test transistor in the second voltage period SV2.

The second voltage interval IV2 may be a voltage interval with which the second gate voltage Vg2 is applied to the gate terminal of the test transistor. For example, the second voltage interval IV2 may be a difference in voltages applied to the gate terminal of the test transistor between a second gate voltage Vg2 and another second gate voltage Vg2.

The second drain current Id2 may be different from the first drain current Id1. The first drain current Id1 may be lower than the second drain current Id2.

The second voltage period SV2 may be a high-current period. Therefore, in case of the high-current period, in case that the pixel inspection device 800 measures the first drain current Id1 of the test transistor, there may be less noise. Therefore, the time required for the noise filtering process for removing the noise may be relatively shorter in the second voltage period SV2 than in the first voltage period SV1.

In an embodiment, the second voltage interval IV2 may be different from the first voltage interval IV1. The second voltage interval IV2 may be shorter than the first voltage interval IV1.

For example, the second drain current Id2 may be measured by applying the second gate voltage Vg2 to the gate terminal of the first test transistor TT1 in order to inspect the characteristics of the first pixel transistor PT1. The second gate voltage Vg2 may be in a range of about −12 V (−1.20E+01 V) to about 0.00E+00 V. A proportion of about 1.00E−06 A or more may be relatively higher in the second drain current Id2 than in the first drain current Id1. Therefore, in case that the pixel inspection device 800 measures the second drain current Id2 of the first test transistor TT1, even in case that the second gate voltage Vg2 is applied to the gate terminal of the first test transistor TT1 in the second voltage period SV2 while being gradually decreased by about 0.25 V from about 0.000E+00 V, noise may be relatively less in the second voltage period SV2, which is a high-current period, than in the first voltage period, SV1, which is a low-current period. The time required for the noise filtering process may be shorter in the second voltage period SV2 than in the first voltage period SV1. Therefore, the second voltage interval IV2 may be shorter than the first voltage interval IV1.

As such, the second gate voltage-drain current graph G2 may be generated based on the measured second drain current Id2.

The method may include determining a defect of the transistor based on the first gate voltage-drain current graph G1 and the second gate voltage-drain current graph G2 (S150).

A gate voltage-drain current graph may include the first gate voltage-drain current graph G1 and the second gate voltage-drain current graph G2. A threshold voltage (Vth), an electron mobility, and an S-factor (sf) of the pixel transistor may be calculated through the gate voltage-drain current graph. In case that the threshold voltage (Vth), the electron mobility, and the S-factor (sf) are out of reference ranges for determining defects of the pixel transistor, the pixel transistor may have defects.

Figure 6:
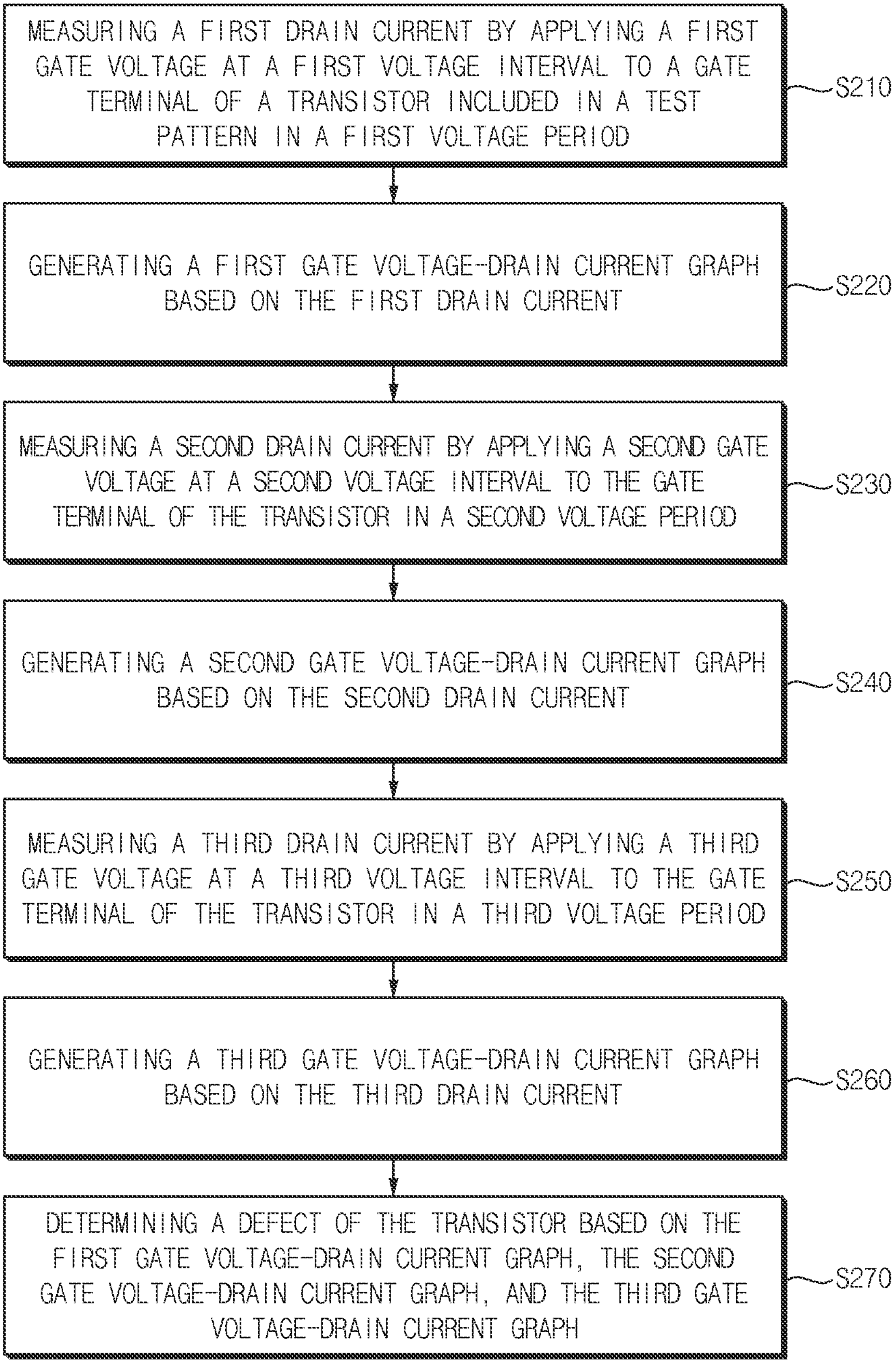
FIG. 6 is a schematic flowchart illustrating a method of inspecting a pixel in FIG. 1 according to embodiments.
Figure 7:
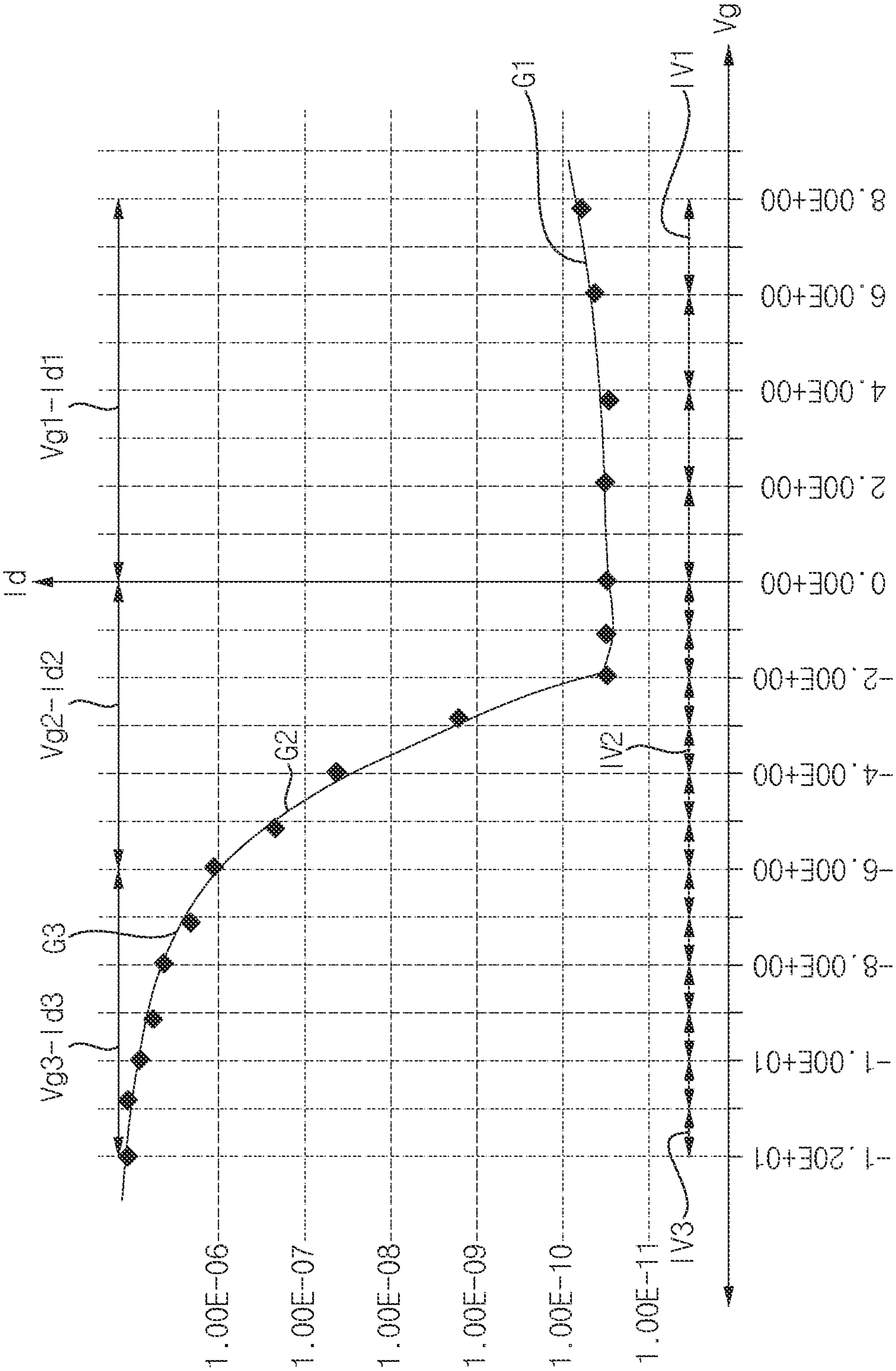
FIG. 7 is a gate voltage-drain current graph generated by the method of FIG. 6.

FIG. 6 is a schematic flowchart illustrating a method of inspecting a pixel in FIG. 1 according to embodiments, and FIG. 7 is a gate voltage-drain current graph generated by the method of FIG. 6.

Referring to FIGS. 1 to 3, 6, and 7, the method of inspecting a pixel may include measuring a first drain current Id1 by applying a first gate voltage Vg1 with a first voltage interval IV1 to a gate terminal of a transistor included in a test pattern 700 in a first voltage period SV1 (S210). The method may include generating a first gate voltage-drain current graph G1 based on the first drain current Id1 (S220). The method may include measuring a second drain current Id2 by applying a second gate voltage Vg2 which is lower than the first gate voltage Vg1 with a second voltage interval IV2 to the gate terminal of the transistor in a second voltage period SV2 which is different from the first voltage period SV1 (S230). The method may include generating a second gate voltage-drain current graph G2 based on the second drain current Id2 (S240). The method may include measuring a third drain current Id3 by applying a third gate voltage Vg3 which is lower than the second gate voltage Vg2 with a third voltage interval IV3 to the gate terminal of the transistor in a third voltage period SV3 which is different from the first voltage period SV1 and the second voltage period SV2 (S250). The method may include generating a third gate voltage-drain current graph G3 based on the third drain current Id3 (S260). The method may include determining a defect of the transistor based on the first gate voltage-drain current graph G1, the second gate voltage-drain current graph G2, and the third gate voltage-drain current graph G3 (S270). At least two of the first voltage interval IV1, the second voltage interval IV2, and the third voltage interval IV3 may be different from each other.

The method may include measuring a first drain current Id1 by applying a first gate voltage Vg1 with a first voltage interval IV1 to a gate terminal of a transistor included in a test pattern 700 in a first voltage period SV1 (S210). The method may include generating a first gate voltage-drain current graph G1 based on the first drain current Id1 (S220).

The pixel inspection device 800 may measure the first drain current Id1 by applying the first gate voltage Vg1 with the first voltage interval IV1 to a gate terminal of a test transistor in the first voltage period SV1 in order to inspect characteristics of a pixel transistor.

The first voltage period SV1 may be a period for measuring the first drain current Id1 of the test transistor, and the first voltage period SV1 may be a low-current period.

The first gate voltage Vg1 may be a voltage applied to the gate terminal of the test transistor in the first voltage period SV1.

The first voltage interval IV1 may be a voltage interval with which the first gate voltage Vg1 is applied to the gate terminal of the test transistor.

The first drain current Id1 may be a low current in the first voltage period SV1. In case of the low-current period, in case that the pixel inspection device 800 measures the first drain current Id1 of the test transistor, there may be much noise.

The first voltage period SV1 may be a low-current period. In case of the low-current period, in case that the pixel inspection device 800 measures the first drain current Id1 of the test transistor, there may be much noise. Therefore, a time required for a noise filtering process for removing noise may be long.

In order to solve the above problem, the first voltage interval IV1 may be greater than the second voltage interval IV2 and the third voltage interval IV3.

For example, the first gate voltage Vg1 may be in a range of 0.00E+00 V to 8.00E+00 V. The first drain current Id1 may be less than or equal to about 1.00E−10 A, which is a low current, and a proportion of the low current may be higher in the first voltage period SV1 than in the second voltage period SV2 and the third voltage period SV3. Therefore, in case that the inspection device measures the first drain current Id1 of a first test transistor TT1, there may be much noise. Accordingly, the time required for the noise filtering process may be long.

In order to solve the above problem, because a number of measurements is reduced in case that the first voltage interval IV1 is about 2.00E+00 V as compared with case that the first voltage interval IV1 is about 0.25 V, detected noise may be reduced.

In an embodiment, a compensation drain current other than the first drain current Id1 measured in the first voltage period SV1 may be determined by using a lookup table (LUT) in which the first drain current Id1 corresponding to the first gate voltage Vg1 is stored.

As described above, the first gate voltage-drain current graph G1 may be generated based on the measured first drain current Id1 and the compensation drain current determined by using the lookup table (LUT).

The method may include measuring a second drain current Id2 by applying a second gate voltage Vg2 which is lower than the first gate voltage Vg1 with a second voltage interval IV2 to the gate terminal of the transistor in a second voltage period SV2 which is different from the first voltage period SV1 (S230). The method may include generating a second gate voltage-drain current graph G2 based on the second drain current Id2 (S240).

Similar to the first voltage period SV1, a proportion of a low-current period may be high in the second voltage period SV2. Therefore, in case that the pixel inspection device 800 measures the second drain current Id2 of the test transistor, there may be much noise. Accordingly, the time required for the noise filtering process for removing the noise may be long.

In order to solve the above problem, the first voltage interval IV1 may be greater than the third voltage interval IV3 (and the second voltage interval IV2). In another embodiment, the first voltage interval IV1 and the second voltage interval IV2 may be greater than the third voltage interval IV3.

For example, the second voltage period SV2 may be in a range of about −6.00E+00 V to about 0.00E+00 V. Because a number of measurements is reduced in case that the first voltage interval IV1 is about 2.00E+00 and the second voltage interval IV2 is about 1.00E+00 V as compared with case that the first voltage interval IV1 and the second voltage interval IV2 is about 0.25 V, detected noise may be reduced.

In an embodiment, a compensation drain current other than the first drain current Id1 and the second drain current Id2 measured in the first voltage period SV1 and the second voltage period SV2 may be determined by using a lookup table (LUT) in which the first drain current Id1 and the second drain current Id2 corresponding to the first gate voltage Vg1 and the second gate voltage Vg2 are stored.

As described above, the first gate voltage-drain current graph G1 and the second gate voltage-drain current graph G2 may be generated based on the measured first drain current Id1, the measured second drain current Id2, and the compensation drain current determined by using the lookup table (LUT).

The method may include measuring a third drain current Id3 by applying a third gate voltage Vg3 which is lower than the second gate voltage Vg2 with a third voltage interval IV3 to the gate terminal of the transistor in a third voltage period SV3 which is different from the first voltage period SV1 and the second voltage period SV2 (S250). The method may include generating a third gate voltage-drain current graph G3 based on the third drain current Id3 (S260).

For example, the pixel inspection device 800 may measure the third drain current Id3 by applying the third gate voltage Vg3 with the third voltage interval IV3 to the gate terminal of the test transistor in order to inspect the characteristics of the pixel transistor.

The third voltage period SV3 may be a period for measuring the third drain current Id3 of the test transistor, and the third voltage period SV3 may be a high-current period.

The third gate voltage Vg3 may be a voltage applied to the gate terminal of the test transistor in the third voltage period SV3.

The third voltage interval IV3 may be a voltage interval with which the third gate voltage Vg3 is applied to the gate terminal of the test transistor. The third voltage interval IV3 may be a difference in voltages applied to the gate terminal of the test transistor between a third gate voltage Vg3 and another third gate voltage Vg3.

The first drain current Id1, the second drain current Id2, and the third drain current Id3 may be different from each other. The first drain current Id1 may be lower than the second drain current Id2. The second drain current Id2 may be lower than the third drain current Id3.

The third voltage period SV3 may be relatively a high-current period than the first voltage period SV1 and the second voltage period SV2, which are low-current periods. Therefore, in case that the pixel inspection device 800 measures the third drain current Id3 of the transistor, noise may be relatively less than noise in the first voltage period SV1 and the second voltage period SV2. Therefore, the time required for the noise filtering process for removing the noise may be relatively short.

For example, the third drain current Id3 may be measured by applying the third gate voltage Vg3 to a gate terminal of the first test transistor TT1 in order to inspect characteristics of a first pixel transistor PT1. The third gate voltage Vg3 may be in a range of about −1.20E+01 V to about −6.00E+00 V. A proportion of about 1.00E−06 A or more may be relatively high in the third drain current Id3. Therefore, in case that the pixel inspection device 800 measures the third drain current Id3 of the first test transistor TT1, noise may be relatively less than the noise in the first voltage period SV1 and the second voltage period SV2. Therefore, even in case that the third gate voltage Vg3 is applied to the gate terminal of the first test transistor TT1 while being gradually decreased by 0.25 V from about −6.00E+00 V, noise generation may be relatively less than noise generation in the first voltage period SV1 and the second voltage period SV2. The time required for the noise filtering process may be shorter in the third voltage period SV3 than in the first voltage period SV1 and the second voltage period SV2. Therefore, the third voltage interval IV3 may be shorter than the first voltage interval IV1 and the second voltage interval IV2.

As described above, the third gate voltage-drain current graph G3 may be generated based on the measured third drain current Id3.

The method may include determining a defect of the transistor based on the first gate voltage-drain current graph G1, the second gate voltage-drain current graph G2, and the third gate voltage-drain current graph G3 (S270).

A gate voltage-drain current graph may include the first gate voltage-drain current graph G1, the second gate voltage-drain current graph G2, and the third gate voltage-drain current graph G3. A threshold voltage (Vth), an electron mobility, and an S-factor (sf) of the pixel transistor may be calculated through the gate voltage-drain current graph. In case that the threshold voltage (Vth), the electron mobility, and the S-factor (sf) are out of reference ranges for determining defects of the transistor, the pixel transistor may have defects.

Figure 8:
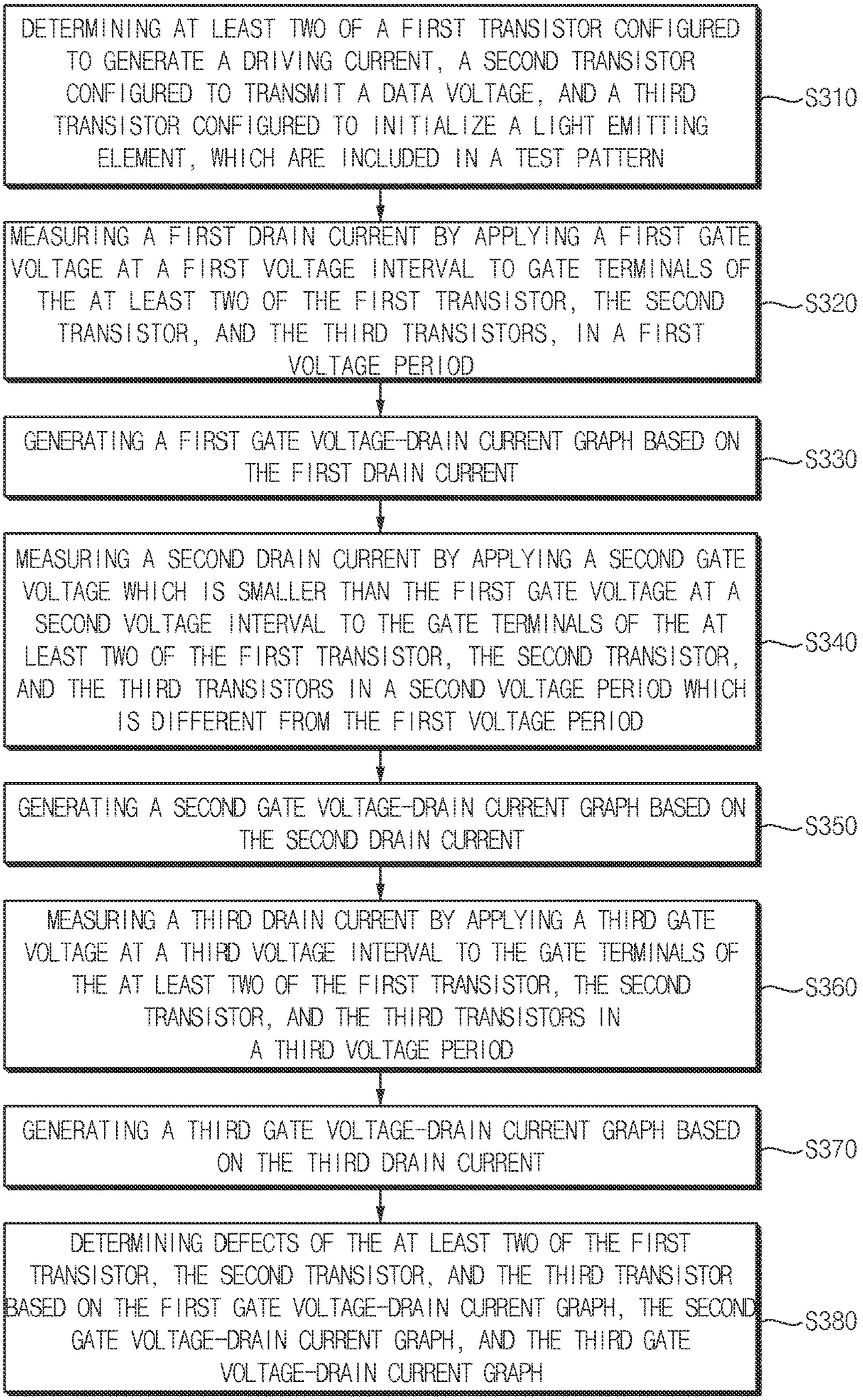
FIG. 8 is a schematic flowchart illustrating a method of inspecting a pixel in FIG. 1 according to embodiments.
Figure 9:
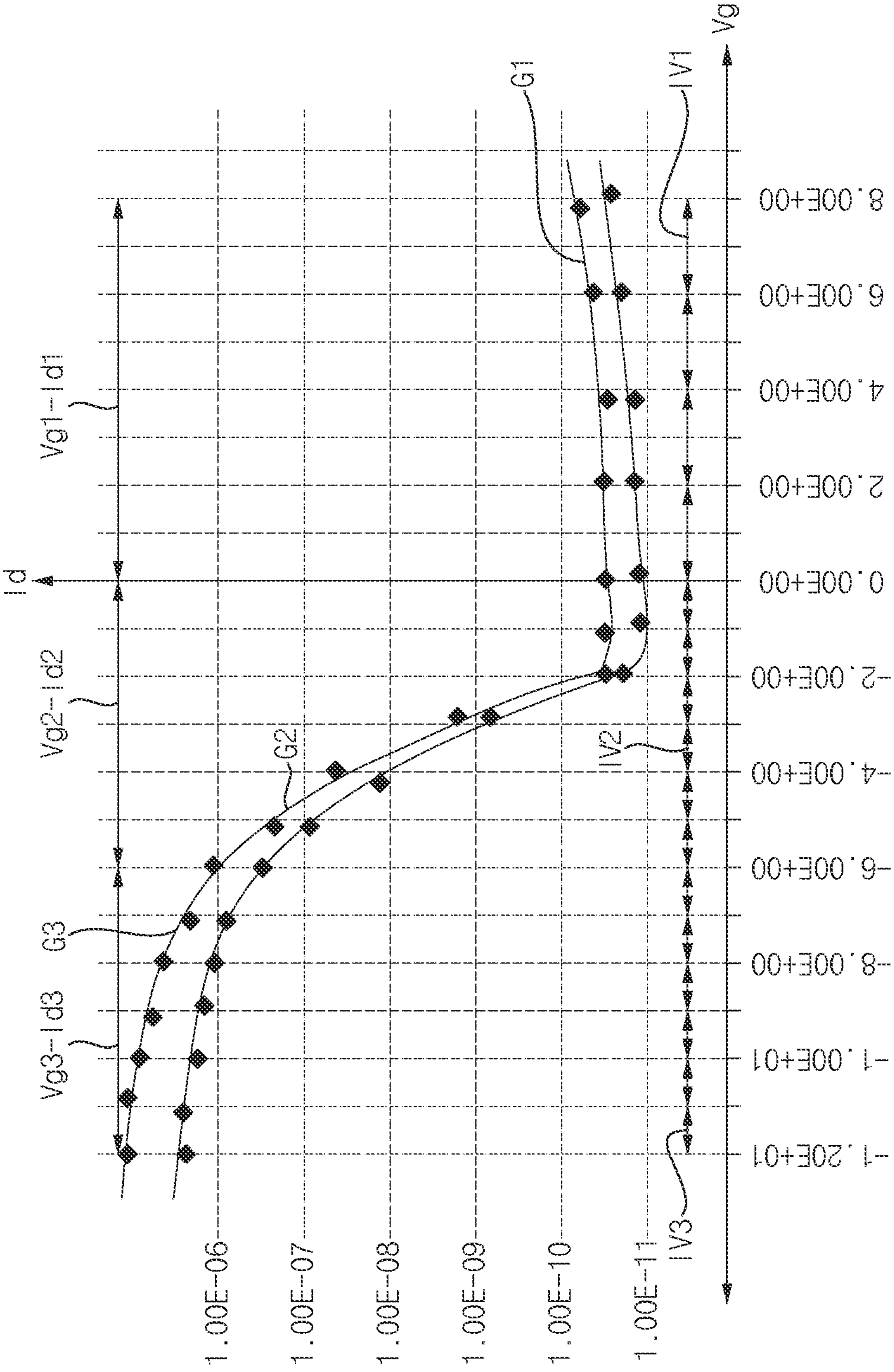
FIG. 9 is a gate voltage-drain current graph generated by the method of FIG. 8.
Figure 10:
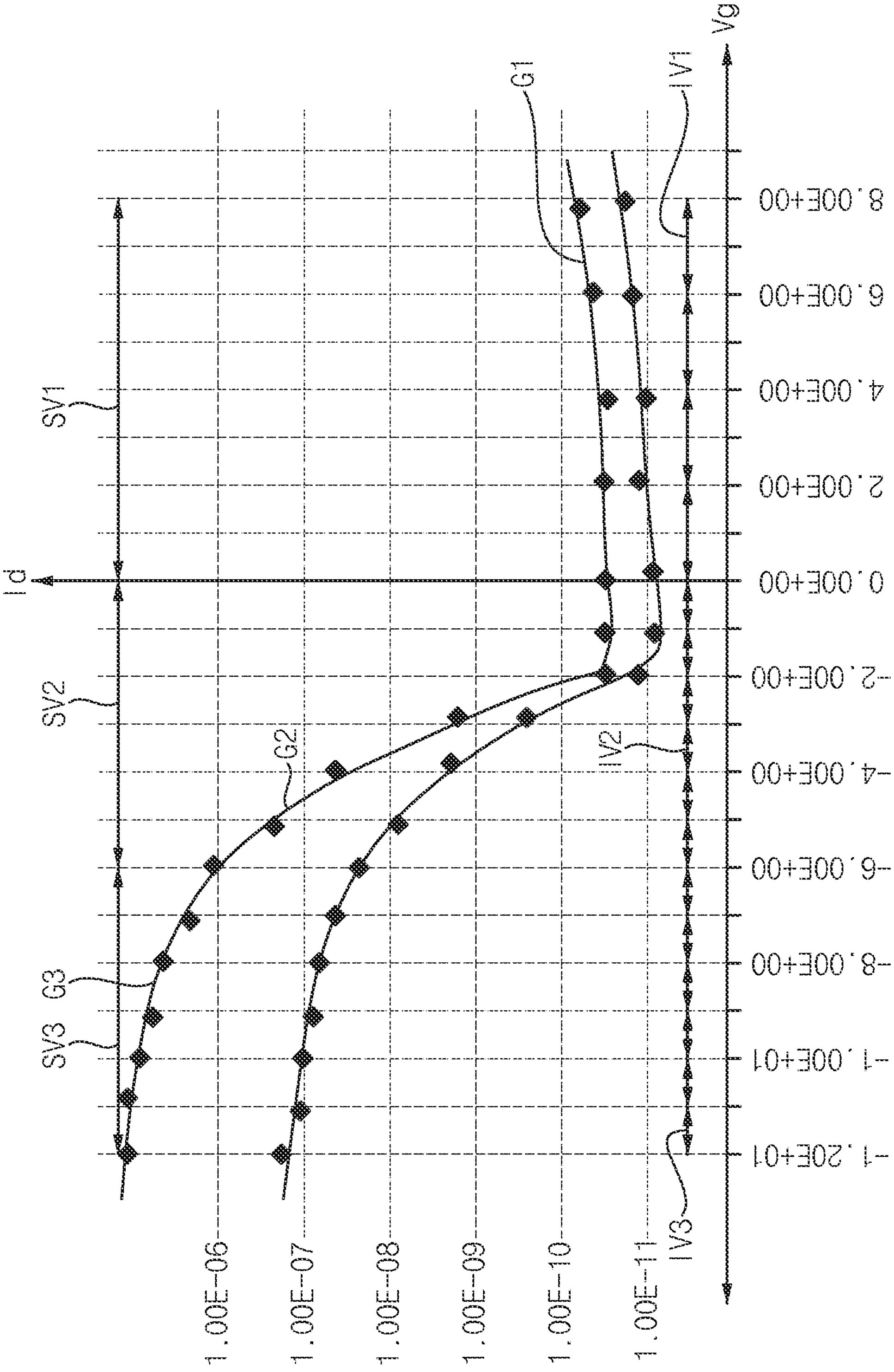
FIG. 10 is a gate voltage-drain current graph generated by the method of FIG. 8.

FIG. 8 is a schematic flowchart illustrating a method of inspecting a pixel in FIG. 1 according to embodiments, FIG. 9 is a gate voltage-drain current graph generated by the method of FIG. 8, and FIG. 10 is a gate voltage-drain current graph generated by the method of FIG. 8.

Referring to FIGS. 1 to 3 and 8 to 10, the method of inspecting a pixel may include determining at least two of a first transistor generating a driving current, a second transistor transmitting a data voltage, and a third transistor initializing a light emitting element EE included in a test pattern 700, in a first voltage period SV1 (S310). The method may include measuring a first drain current Id1 by applying a first gate voltage Vg1 with a first voltage interval IV1 to gate terminals of determined first, second, and third transistors (e.g., at least two of transistors determined among the first transistor, the second transistor, and the third transistor) (S320). The method may include generating a first gate voltage-drain current graph G1 based on the first drain current Id1 (S330). The method may include measuring a second drain current Id2 by applying a second gate voltage Vg2 which is lower than the first gate voltage Vg1 with a second voltage interval IV2 to the gate terminals of the determined first, second, and third transistors in a second voltage period SV2 which is different from the first voltage period SV1 (S340). The method may include generating a second gate voltage-drain current graph G2 based on the second drain current Id2 (S350). The method may include measuring a third drain current Id3 by applying a third gate voltage Vg3 which is lower than the second gate voltage Vg2 with a third voltage interval IV3 to the gate terminals of the determined first, second, and third transistors in a third voltage period SV3 which is different from the first voltage period SV1 and the second voltage period SV2 (S360). The method may include generating a third gate voltage-drain current graph G3 based on the third drain current Id3 (S370). The method may include determining defects of the first transistor, the second transistor, and the third transistor based on the first gate voltage-drain current graph G1, the second gate voltage-drain current graph G2, and the third gate voltage-drain current graph G3 (S380). At least two of the first voltage interval IV1, the second voltage interval IV2, and the third voltage interval IV3 may be different from each other.

The method of FIG. 8 and the method of FIG. 6 may be substantially the same except for performing an inspection on transistors. Therefore, redundant descriptions of the same or corresponding components will be omitted.

The pixel inspection device 800 may measure a drain current Id by applying a gate voltage Vg with the first voltage interval IV1, the second voltage interval IV2, and the third voltage interval IV3 to gate terminals of transistors included in the test pattern 700 in the first voltage period SV1, the second voltage period SV2, and the third voltage period SV3.

An inspection time may be shortened in case that an inspection is performed on transistors included in the test pattern 700 as compared with case that an inspection is performed on a transistor included in the test pattern 700.

Referring to FIG. 9, the transistors may be transistors of a type.

For example, the drain current Id may be measured by applying the gate voltage Vg to gate terminals of first test transistors TT1 in order to inspect characteristics of a first pixel transistor PT1.

For example, the drain current Id may be measured by applying the gate voltage Vg to gate terminals of second test transistors TT2 in order to inspect characteristics of a second pixel transistor PT2.

For example, the drain current Id may be measured by applying the gate voltage Vg to gate terminals of third test transistors TT3 in order to inspect characteristics of a third pixel transistor PT3.

Referring to FIG. 10, the transistors may be transistors of various types.

For example, the drain current Id may be measured by applying the gate voltage Vg to gate terminals of first test transistors TT1 and second test transistors TT2 in order to inspect characteristics of a first pixel transistor PT1 and a second pixel transistor PT2.

For example, the drain current Id may be measured by applying the gate voltage Vg to gate terminals of the first test transistors TT1 and third test transistors TT3 in order to inspect characteristics of the first pixel transistor PT1 and a third pixel transistor PT3.

For example, the drain current Id may be measured by applying the gate voltage Vg to the gate terminals of the second test transistors TT2 and the third test transistors TT3 in order to inspect the characteristics of the second pixel transistor PT2 and the third pixel transistor PT3.

For example, the drain current Id may be measured by applying the gate voltage Vg to the gate terminals of the first test transistors TT1, the second test transistors TT2, and the third test transistors TT3 in order to inspect the characteristics of the first pixel transistor PT1, the second pixel transistor PT2, and the third pixel transistor PT3.

As described above, an inspection time may be shortened in case that characteristics of transistors are simultaneously measured as compared with case that characteristics of a transistor are measured As such, an inspection time may be shorter in case that characteristics of transistors are measured at the same time than in case that characteristics of a transistor are measured.

Figure 11:
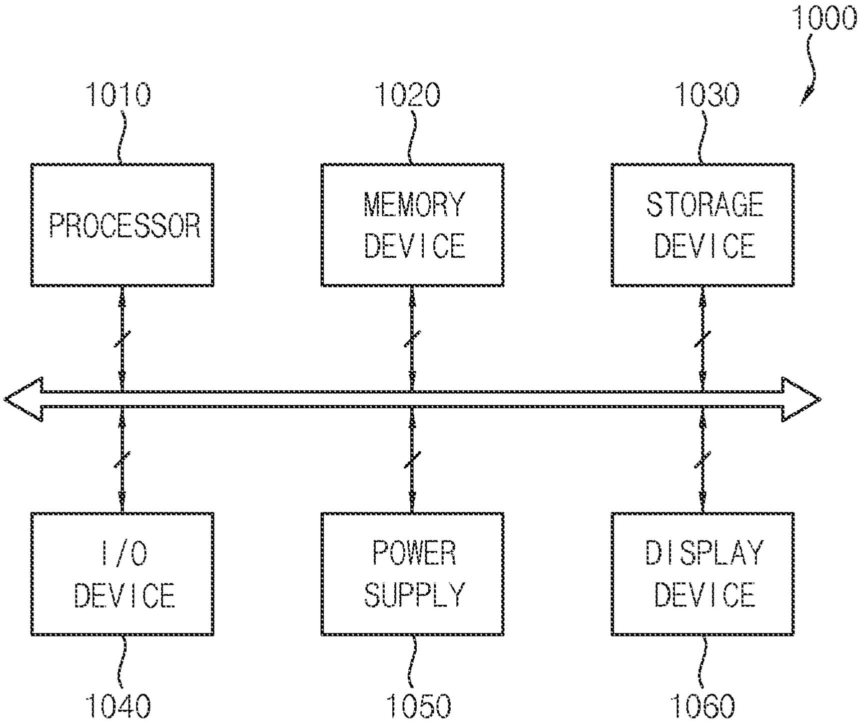
FIG. 11 is a schematic block diagram illustrating an electronic device according to embodiments.
Figure 12:
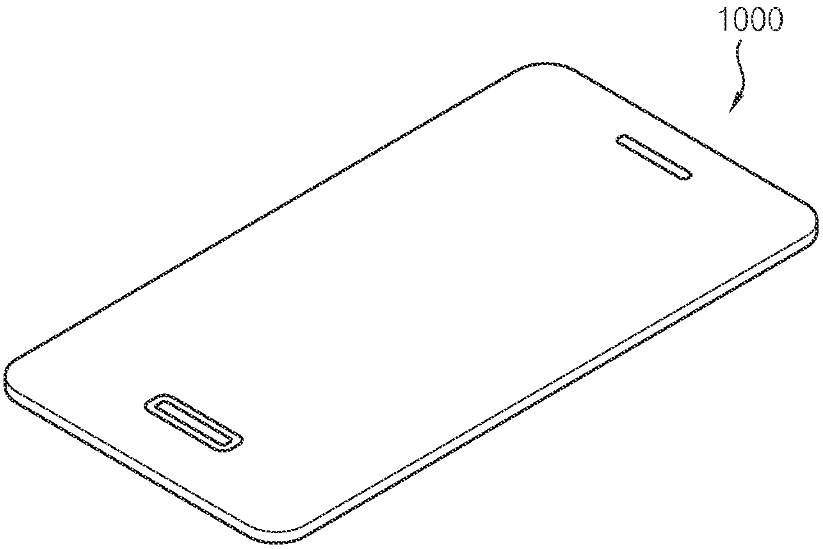
FIG. 12 is a schematic diagram illustrating the electronic device of FIG. 11 which is implemented as a smart phone according to embodiments.

FIG. 11 is a schematic block diagram illustrating an electronic device 1000 according to embodiments. FIG. 12 is a schematic diagram illustrating the electronic device 1000 of FIG. 11 which is implemented as a smart phone according to embodiments.

Referring to FIGS. 11 and 12, the electronic device 1000 may include a processor 1010, a memory device 1020, a storage device 1030, an input/output (I/O) device 1040, a power supply 1050, and a display device 1060. The display device 1060 may be the display device 10 of FIG. 1. The electronic device 1000 may further include ports for communicating with a video card, a sound card, a memory card, a universal serial bus (USB) device, other electronic device, or the like.

In an embodiment, as illustrated in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be electrically connected to other components via an address bus, a control bus, a data bus, or the like. Further, the processor 1010 may be electrically connected to an extended bus such as a peripheral component interconnection (PCI) bus or the like.

The memory device 1020 may store data for operations of the electronic device 1000. For example, the memory device 1020 may include non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, the like, or a combination thereof and/or volatile memory device such as a dynamic random access memory (DRAM) device, a static random access memory (SRAM) device, a mobile DRAM device, the like, or a combination thereof.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, the like, or a combination thereof, and an output device such as a printer, a speaker, the like, or a combination thereof. In an embodiment, the I/O device 1040 may include the display device 1060.

The power supply 1050 may provide power for operations of the electronic device 1000.

The display device 1060 may be electrically connected to other components through buses, other communication links, the like, or a combination thereof.

The embodiments may be applied to a display device and an electronic device including the display device. For example, the embodiments may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, or the like.

The above description is an example of technical features of the disclosure, and those skilled in the art to which the disclosure pertains will be able to make various modifications and variations. Therefore, the embodiments of the disclosure described above may be implemented separately or in combination with each other. Accordingly, all such modifications are intended to be included within the scope of the embodiment as defined in the claims. In the claims, means-plus-function clauses are intended to cover the structures described herein as performing the recited function and not only structural equivalents but also equivalent structures. Therefore, it is to be understood that the foregoing is illustrative of the embodiment and is not to be construed as limited to the specific embodiments disclosed, and that modifications to the disclosed embodiments, as well as other embodiments, are intended to be included within the scope of the appended claims. The embodiment is defined by the following claims, with equivalents of the claims to be included therein.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A method of inspecting a pixel, the method comprising:

measuring a first drain current by applying a first gate voltage with a first voltage interval to a gate terminal of a transistor included in a test pattern in a first voltage period;

generating a first gate voltage-drain current graph based on the first drain current;

measuring a second drain current by applying a second gate voltage which is lower than the first gate voltage with a second voltage interval which is different from the first voltage interval to the gate terminal of the transistor in a second voltage period which is different from the first voltage period;

generating a second gate voltage-drain current graph based on the second drain current; and determining a defect of the transistor based on the first gate voltage-drain current graph and the second gate voltage-drain current graph.

2. The method of claim 1, wherein the first drain current and the second drain current are different.

3. The method of claim 2, wherein the first drain current is lower than the second drain current.

4. The method of claim 1, wherein the first voltage interval is greater than the second voltage interval.

5. The method of claim 4, wherein a compensation drain current other than the first drain current measured in the first voltage period is determined by using a lookup table in which the first drain current corresponding to the first gate voltage is stored.

6. A method of inspecting a pixel, the method comprising:

measuring a first drain current by applying a first gate voltage with a first voltage interval to a gate terminal of a transistor included in a test pattern in a first voltage period;

generating a first gate voltage-drain current graph based on the first drain current;

measuring a second drain current by applying a second gate voltage which is lower than the first gate voltage with a second voltage interval to the gate terminal of the transistor in a second voltage period which is different from the first voltage period;

generating a second gate voltage-drain current graph based on the second drain current;

measuring a third drain current by applying a third gate voltage which is lower than the second gate voltage with a third voltage interval to the gate terminal of the transistor in a third voltage period which is different from the first voltage period and the second voltage period;

generating a third gate voltage-drain current graph based on the third drain current; and determining a defect of the transistor based on the first gate voltage-drain current graph, the second gate voltage-drain current graph, and the third gate voltage-drain current graph, wherein at least two of the first voltage interval, the second voltage interval, and the third voltage interval are different from each other.

7. The method of claim 6, wherein the first drain current, the second drain current, and the third drain current are different from each other.

8. The method of claim 7, wherein the first drain current is lower than the second drain current.

9. The method of claim 8, wherein the second drain current is lower than the third drain current.

10. The method of claim 6, wherein the first voltage interval and the second voltage interval are greater than the third voltage interval.

11. The method of claim 10, wherein a compensation drain current other than the first drain current measured in the first voltage period and the second drain current measured in the second voltage period is determined by using a lookup table in which the first drain current corresponding to the first gate voltage and the second drain current corresponding to the second gate voltage are stored.

12. The method of claim 6, wherein the first voltage interval is greater than the second voltage interval and the third voltage interval.

13. The method of claim 12, wherein a compensation drain current other than the first drain current measured in the first voltage period is determined by using a lookup table in which the first drain current corresponding to the first gate voltage is stored.

14. A method of inspecting a pixel, the method comprising:

determining at least two of a first transistor that generates a driving current, a second transistor that transmits a data voltage, and a third transistor that initializes a light emitting element, which are included in a test pattern;

measuring a first drain current by applying a first gate voltage with a first voltage interval to gate terminals of the at least two of the first transistor, the second transistor, and the third transistor, in a first voltage period;

generating a first gate voltage-drain current graph based on the first drain current;

measuring a second drain current by applying a second gate voltage which is lower than the first gate voltage with a second voltage interval to the gate terminals of the at least two of the first transistor, the second transistor, and the third transistor in a second voltage period which is different from the first voltage period;

generating a second gate voltage-drain current graph based on the second drain current;

measuring a third drain current by applying a third gate voltage which is lower than the second gate voltage with a third voltage interval to the gate terminals of the at least two of the first transistor, the second transistor, and the third transistor in a third voltage period which is different from the first voltage period and the second voltage period;

generating a third gate voltage-drain current graph based on the third drain current; and determining defects of the at least two of the first transistor, the second transistor, and the third transistor based on the first gate voltage-drain current graph, the second gate voltage-drain current graph, and the third gate voltage-drain current graph, wherein at least two of the first voltage interval, the second voltage interval, and the third voltage interval are different from each other.

15. The method of claim 14, wherein the first drain current, the second drain current, and the third drain current are different from each other.

16. The method of claim 15, wherein the first drain current is lower than the second drain current, and the second drain current is lower than the third drain current.

17. The method of claim 15, wherein the first voltage interval is greater than the second voltage interval and the third voltage interval.

18. The method of claim 17, wherein a compensation drain current other than the first drain current measured in the first voltage period is determined by using a lookup table in which the first drain current corresponding to the first gate voltage is stored.

19. The method of claim 14, wherein the first voltage interval and the second voltage interval are greater than the third voltage interval.

20. The method of claim 19, wherein a compensation drain current other than the first drain current measured in the first voltage period and the second drain current measured in the second voltage period is determined by using a lookup table in which the first drain current corresponding to the first gate voltage and the second drain current corresponding to the second gate voltage are stored.

* * * * *